United States Patent
Tervonen et al.

(10) Patent No.: US 10,299,174 B2
(45) Date of Patent: May 21, 2019

(54) METHOD AND APPARATUS FOR IDENTIFIER SIGNALING

(71) Applicant: Nokia Solutions and Networks Oy, Espoo (FI)

(72) Inventors: Janne Petteri Tervonen, Espoo (FI); György Tamás Wolfner, Budapest (HU); Jari Pekka Mustajärvi, Espoo (FI); Janne Marin, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 15/514,658

(22) PCT Filed: Sep. 30, 2014

(86) PCT No.: PCT/EP2014/070916
§ 371 (c)(1),
(2) Date: Mar. 27, 2017

(87) PCT Pub. No.: WO2016/050278
PCT Pub. Date: Apr. 7, 2016

(65) Prior Publication Data
US 2017/0223582 A1    Aug. 3, 2017

(51) Int. Cl.
*H04W 36/00* (2009.01)
*H04W 92/02* (2009.01)

(52) U.S. Cl.
CPC ........ *H04W 36/0066* (2013.01); *H04W 92/02* (2013.01)

(58) Field of Classification Search
CPC .. H04W 36/0066; H04W 36/00; H04W 92/02
See application file for complete search history.

(56) References Cited

U.S. PATENT DOCUMENTS

| | | | |
|---|---|---|---|
| 2008/0311911 A1* | 12/2008 | Koodli | H04W 36/0066 455/436 |
| 2014/0051393 A1* | 2/2014 | Mildh | H04W 76/10 455/411 |

(Continued)

FOREIGN PATENT DOCUMENTS

| | | |
|---|---|---|
| WO | 2007/031604 A1 | 3/2007 |
| WO | 2014/000808 A1 | 1/2014 |

(Continued)

OTHER PUBLICATIONS

"3rd Generation Partnership Project; Technical Specification Group Core Network and Terminals; Wireless LAN control plane protocol for trusted WLAN access to EPC; Stage 3 (Release 12)", 3GPP TS 24.244, V1.2.0, May 2014, pp. 1-33.
"3rd Generation Partnership Project; Technical Specification Group Core Network and Terminals; Numbering, addressing and identification (Release 12)", 3GPP TS 23.003, V12.3.1, Jul. 2014, pp. 1-90.
3rd Generation Partnership Project; Technical Specification Group Radio Access Network; Radio Resource Control (RRC);Protocol specification (Release 12), 3GPP TS 25.331, V12.2.0, Jun. 2014.

(Continued)

*Primary Examiner* — Lakeram Jangbahadur
(74) *Attorney, Agent, or Firm* — Nokia Technologies Oy

(57) ABSTRACT

A method and apparatus can be configured to attach to a first network. The first network may use a first radio-access technology. The method may also comprise connecting to a second network. The second network may use a second radio-access technology. The method may also comprise transmitting an identifier to the second network. The identifier may relate to a first network node of the first network to which the apparatus may be attached.

8 Claims, 10 Drawing Sheets

(56) References Cited

U.S. PATENT DOCUMENTS

| | | | | |
|---|---|---|---|---|
| 2015/0173000 A1* | 6/2015 | Basilier | ............. | H04W 48/18 370/329 |
| 2015/0181491 A1* | 6/2015 | Van Phan | ............. | H04W 28/08 370/331 |
| 2015/0358877 A1* | 12/2015 | Wei | ............. | H04W 36/14 370/331 |
| 2016/0066239 A1* | 3/2016 | Hedberg | ............. | H04W 48/18 370/332 |

FOREIGN PATENT DOCUMENTS

| | | |
|---|---|---|
| WO | 2014/110803 A1 | 7/2014 |
| WO | 2016/029953 A1 | 3/2016 |
| WO | 2016/050281 A1 | 4/2016 |

OTHER PUBLICATIONS

"3rd Generation Partnership Project; Technical Specification Group Radio Access Network; Evolved Universal Terrestrial Radio Access (E-UTRA); Radio Resource Control (RRC);Protocol specification (Release 12)", 3GPP TS 36.331, V12.2.0, Jun. 2014, pp. 1-365.

International Search Report and Written Opinion received for corresponding Patent Cooperation Treaty Application No. PCT/EP2014/070916, dated Jun. 11, 2015, 14 pages.

"3rd Generation Partnership Project;Technical Specification Group Services and System Aspects;Feasibility study on 3GPP system to Wireless Local Area Network (WLAN) interworking (Release 11)", 3GPP TR 22.934, V11.0.0, Sep. 2012, pp. 1-30.

"WLAN/3GPP Radio Interworking—More on IDLE and CONNECTED mode", 3GPP TSG-RAN Working Group 2 meeting #82, R2-131886, Agenda: 5.1.1, Ericsson, May 20-24, 2013, pp. 1-10.

* cited by examiner

METHOD AND APPARATUS FOR IDENTIFIER SIGNALING

RELATED APPLICATION

This application was originally filed as PCT Application No. PCT/EP2014/070916 filed Sep. 30, 2014.

BACKGROUND

Field

Embodiments of the invention relate to a method and apparatus for signaling an identifier in an environment comprising of two networks.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may comprise attaching, by a user equipment, to a first network. The method may also comprise connecting to a second network. The second network may use a second radio-access technology. The method may also comprise transmitting an identifier to the second network. The identifier may relate to a first network node of the first network to which the user equipment may be attached to.

In the method of the first embodiment, the transmitting may comprise transmitting the identifier after the user equipment performs cell re-selection from a second network node of the first network to the first network node of the first network.

In the method of the first embodiment, the transmitting may comprise transmitting the identifier to a first network node of the second network after the user equipment performs a change from a second network node of the second network to the first network node of the second network.

In the method of the first embodiment, the first radio-access technology may correspond to a cellular Radio-Access Network, and the second radio-access technology may correspond to a Wireless Local Area Network.

In the method of the first embodiment, the transmitting the identifier may comprise transmitting an identifier of the first network node of the first network.

In the method of the first embodiment, the transmitting the identifier may comprise transmitting a current cell identity.

In the method of the first embodiment, the transmitting the identifier may comprise transmitting a globally unique cell identity.

In the method of the first embodiment, the globally unique cell identity may comprise a location-area code and a cell identity.

In the method of the first embodiment, the globally unique cell identity further may comprise a mobile-country code and a mobile-network code.

In the method of the first embodiment, the transmitting may comprise transmitting a signaling message.

In the method of the first embodiment, the transmitting may comprise transmitting the identifier in an information element of a signaling message.

According to a second embodiment, an apparatus may comprise an attaching means to attach to a first network. The first network may use a first radio-access technology. The apparatus may also comprise a connecting means to connect to a second network. The second network may use a second radio-access technology. The apparatus may also comprise a transmitting means for transmitting an identifier to the second network. The identifier may relate to a first network node of the first network to which the apparatus may be attached to.

In the apparatus of the second embodiment, the transmitting may comprise transmitting the identifier after the apparatus performs cell re-selection from a second network node of the first network to the first network node of the first network.

In the apparatus of the second embodiment, the transmitting may comprise transmitting the identifier to a first network node of the second network after the apparatus performs a change from a second network node of the second network to the first network node of the second network.

In the apparatus of the second embodiment, the first radio-access technology may correspond to Radio-Access Network, and the second radio-access technology may correspond to a Wireless Local Area Network.

In the apparatus of the second embodiment, the transmitting the identifier may comprise transmitting an identifier of the first network node of the first network.

In the apparatus of the second embodiment, the transmitting the identifier may comprise transmitting a current cell identity.

In the apparatus of the second embodiment, the transmitting the identifier may comprise transmitting a globally unique cell identity.

In the apparatus of the second embodiment, the globally unique cell identity may comprise a location-area code and a cell identity.

In the apparatus of the second embodiment, the globally unique cell identity further may comprise a mobile-country code and a mobile-network code.

In the apparatus of the second embodiment, the transmitting may comprise transmitting a signaling message.

In the apparatus of the second embodiment, the transmitting may comprise transmitting the identifier in an information element of a signaling message.

In the apparatus of the second embodiment, the apparatus may comprise a user equipment.

According to a third embodiment, a computer program product may be embodied on a non-transitory computer readable medium. The computer program product may be configured to control a processor to perform a method according to the first embodiment.

According to a fourth embodiment, a method may comprise receiving, by a first network node of a second network, an identifier. The identifier may be received from a user equipment, the user equipment may be attached to a first network, the first network may use a first radio-access technology, the second network may use a second radio-access technology, and the identifier may relate to a first network node of the first network to which the user equipment may be attached to. The method may also comprise contacting one of the identified first network node of the first network and a server.

In the method of the fourth embodiment, the Server may comprise a Traffic Steering Server entity.

In the method of the fourth embodiment, the receiving may comprise receiving the identifier after the user equipment has performed handover from a previous network node of the first network to the current network node of the first network.

In the method of the fourth embodiment, the first radio-access technology may correspond to Radio-Access Network, and the second radio-access technology may correspond to Wireless Local Area Network.

In the method of the fourth embodiment, the receiving the identifier may comprise receiving an identifier of the first network node of the first network.

In the method of the fourth embodiment, the receiving the identifier may comprise receiving a current cell identity.

In the method of the fourth embodiment, the receiving the identifier may comprise receiving a globally unique cell identity.

In the method of the fourth embodiment, the globally unique cell identity may comprise a location-area code and a cell identity.

In the method of the fourth embodiment, the globally unique cell identity further may comprise a mobile-country code and a mobile-network code.

In the method of the fourth embodiment, the contacting the identified network node may comprise exchanging load information with the identified network node.

In the method of the fourth embodiment, the receiving may comprise receiving a signaling message.

In the method of the fourth embodiment, the receiving may comprise receiving the identifier in an information element of a signaling message.

According to a fifth embodiment, an apparatus may comprise a receiving means for receiving an identifier. The identifier may be received from a user equipment, the user equipment may be attached to a first network, the first network may use a first radio-access technology, the second network may use a second radio-access technology, and the identifier may relate to a first network of the first network to which the user equipment may be attached to. The apparatus may also comprise a contacting means for contacting one of the identified first network node of the first network and a server.

In the apparatus of the fifth embodiment, the server may comprise a Traffic Steering Server entity.

In the apparatus of the fifth embodiment, the receiving may comprise receiving the identifier after the user equipment has performed handover from a previous network node of the first network to the current network node of the first network.

In the apparatus of the fifth embodiment, the first radio-access technology may correspond to Radio-Access Network, and the second radio-access technology may correspond to Wireless Local Area Network.

In the apparatus of the fifth embodiment, the receiving the identifier may comprise receiving an identifier of the first network node of the first network.

In the apparatus of the fifth embodiment, the receiving the identifier may comprise receiving a current cell identity.

In the apparatus of the fifth embodiment, the receiving the identifier may comprise receiving a globally unique cell identity.

In the apparatus of the fifth embodiment, the globally unique cell identity may comprise a location-area code and a cell identity.

In the apparatus of the fifth embodiment, the globally unique cell identity further may comprise a mobile-country code and a mobile-network code.

In the apparatus of the fifth embodiment, the contacting the identified network node may comprise exchanging load information with the identified network node.

In the apparatus of the fifth embodiment, the receiving may comprise receiving a signaling message.

In the apparatus of the fifth embodiment, the receiving may comprise receiving the identifier in an information element of a signaling message.

According to a sixth embodiment, a computer program product may be embodied on a non-transitory computer readable medium. The computer program product may be configured to control a processor to perform a method according to the fourth embodiment.

According to a seventh embodiment, a system may comprise a first apparatus. The first apparatus may comprise a first attaching means to attach to a first network. The first network may use a first radio-access technology. The first apparatus may also comprise connecting a means to connect to a second network. The second network may use a second radio-access technology. The first apparatus may also comprise a transmitting means for transmitting an identifier to the second network. The identifier may relate to a first network node of the first network to which the first apparatus is attached to. The system may also comprise a second apparatus. The second apparatus may comprise a receiving means for receiving the identifier. The second apparatus may also comprise a contacting means for contacting one of the identified first network node of the first network and a server.

According to an eighth embodiment, an apparatus may comprise at least one processor and at least one memory including computer program code. The at least one memory and the computer program code may be configured, with the at least one processor, to cause the apparatus at least to attach to a first network. The first network may use a first radio-access technology. The apparatus may also be caused to connect to a second network. The second network may use a second radio-access technology. The apparatus may also be caused to transmit an identifier to the second network. The identifier may relate to a first network node of the first network to which the apparatus is attached to.

According to a ninth embodiment, an apparatus may comprise at least one processor and at least one memory including computer program code. The at least one memory and the computer program code may be configured, with the at least one processor, to cause the apparatus at least to receive an identifier, wherein the identifier may be received from a user equipment. The user equipment may be attached to a first network, the first network may use a first radio-access technology, a second network may use a second radio-access technology, and the identifier may relate to a first network node of the first network to which the user equipment is attached to. The apparatus may also be caused to contact one of the identified first network node of the first network and a server.

BRIEF DESCRIPTION OF THE DRAWINGS

For proper understanding of the invention, reference should be made to the accompanying drawings, wherein.

DETAILED DESCRIPTION

Figure 1A:
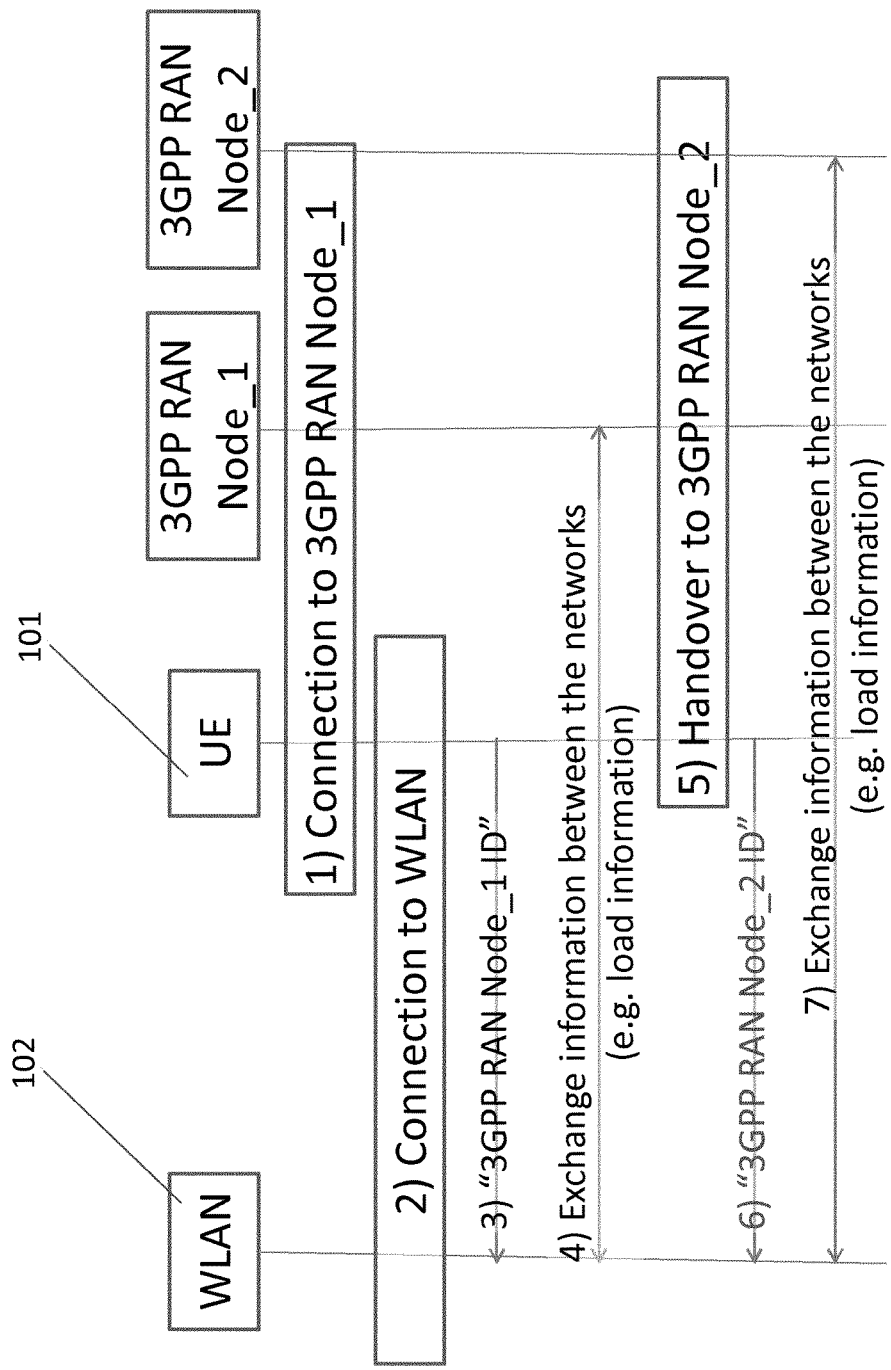
FIG. 1(a) illustrates using an identifier in accordance with one embodiment.

Embodiments of the invention relate to using a cell identity in Wi-Fi signaling. Embodiments of the present invention can be utilized to implement 3GPP and Wireless Local Area Network (WLAN) interworking. Currently, there are a number of ongoing initiatives, directed to both 3GPP and Wi-Fi standardization, to enable operator-controlled/influenced interworking of WLAN and 3GPP networks. On the 3GPP side, there are active work or study items relating to this topic in RAN2 and RAN3. Also, in SA2 and CT1, 3GPP—WLAN interworking has been an area of technical interest since Release-8. These efforts have been directed to integrating WLAN accessing with 3GPP-packet-core functions, along with integrating ANDSF (Access Network Discovery and Selection Function).

With respect to WLAN standardization, the main activities for developing 3GPP—WLAN interworking have been directed by the Wi-Fi Alliance (WFA). The Wi-Fi Alliance is generally responsible for defining which features are supported by products (that use 3GPP—WLAN interworking). As directed by WFA, Multiband Operations (MBO) and Optimized Connectivity Experience (OCE) are one of the working groups that will address cellular interworking. Efforts relating to Hotspot 2.0 Release-3 may also address cellular interworking. For Multiband Operation (MBO), preliminary work for specifying the features of cellular interworking has started, and it has already been agreed to that WLAN/Wi-Fi will provide signalling to 3GPP Radio-Access-Technologies (3GPP) in order to guide/command the UEs.

If a new interface is defined between the 3GPP RAN and the WLAN, then one issue to be addressed relates to determining how to discover network element instances, where a particular UE of one network may be connected to and/or connected in another access network. Embodiments of the present invention may address the scenario when the UE exhibits mobility within the 3GPP access network or the WLAN network.

Currently, devices/UEs normally operate in a manner such that one technology of either 3GPP technology or WLAN technology is active. While one of these technologies is active, the other technology is generally kept on idle mode and/or is not connected to the devices/UE. When the devices/UEs use WLAN radio-access technologies, 3GPP Packet-Data-Protocol (PDP) context information may be released by the UE, or the state of the UE may be changed to idle. In LTE, if the device/UE is changed to idle, an IP address may exist for the device/UE, but there may be no active connection between the UE and 3GPP RAN. When the UE is in idle mode on the 3GPP side, the 3GPP RAN network may not know exactly where the UE is camping due to, for example, the UE's idle-mode mobility.

When performing traffic steering decisions, a lack of awareness regarding the location where the device/UE is camping may be problematic. One example of performing traffic steering decisions may be the deciding of whether the UE/device should be moved back to 3GPP RAT from WLAN. If the UE's camping location is not known, the RAN network will generally not know whether a target 3GPP cell is capable of accepting the UE load generated in WLAN network (for example, if the target 3GPP cell can handle the traffic related to the UE). Further, with Heterogeneous Network (HetNet) deployments for 3GPP RATs, multiple 3GPP cells of different or same radio access technology can overlap the same area. HetNet deployments are generally considered to be deployments that include macro, micro, and/or pico deployments, for example.

In another approach, a special identity (ID) may be generated by the 3GPP RAN and may be provided to the UE. The special ID may comprise an identifier (address) of the eNB, which may help the WLAN to find the eNB to which the UE is connected to during the initial attaching of the UE to WLAN.

With another approach, the idle state mobility scenario is addressed by introducing new signalling between the UE and the eNB in the case of idle-state mobility.

The current preliminary MBO specification draft provides an indication regarding whether the UE is available for cellular connectivity. However, this indication is only a simple indication that does not comprise any context. For example, the indication may be a one-bit field.

Another approach may use RAN addressing information as part of a temporary identifier. The RAN addressing information may be used to access a correct RAN node. Embodiments of the present invention may send a type of information that is the same as the information of the other approaches. However, embodiments of the present invention use the information and transfer the information in a different manner as compared to the other approaches.

In embodiments of the present invention, the UE may send a serving 3GPP RAN node identifier (address) to the WLAN whenever there is a mobility event (regardless of whether the UE is idle or active) on the 3GPP side or on the WLAN side. Then, the WLAN (in case of mobility on the WLAN side the "new" WLAN node/AP) may use this identifier (address) to contact the appropriate 3GPP RAN node. As described in further detail below, the UE may be attached to, connected to, and/or camping on a network. "Attaching" generally means that the UE has registered itself to an EPC (Packet Core network). The EPC is generally able to reach the attached UE via paging if there is no active connection with the EPC. Whether a connection exists (i.e., an "active" mode) or a connection does not exist (i.e., an "idle" mode) is irrelevant for the attached state. "Connecting" generally means that the UE has a RAN connection and some dedicated channel. Both may be able to immediately send to each other. "Connected" generally corresponds to an "active" mode. "Camping" generally means that the UE does not have a connection with a RAN (the UE is in "idle" mode) and is just listening to broadcasts from the cell under which the UE is camping on.

Referring to FIG. 1(a), during step 1, UE 101 may be attached to a 3GPP RAN node 1. Although step 1 illustrates that UE 101 may be in a connected (active) state with respect to 3GPP RAN node 1, in other embodiments, UE 101 may be in an idle state on a cell of 3GPP RAN node 1. During step 2, UE 101 may create a connection to WLAN 102 as well. During the establishing of the connection from UE 101 to WLAN, the UE may provide the 3GPP RAN node identifier to the WLAN (which identifies 3GPP RAN Node 1). At step 4, based on the information received in step 3, the WLAN can contact the appropriate 3GPP RAN (for example, to exchange load information). At step 5, the UE performs a handover from 3GPP RAN Node 1 to 3GPP RAN node 2 or moves silently (camps) under RAN Node 2 by starting to listen to broadcasts from the RAN Node 2 instead of RAN Node 1. Although step 5 illustrates that UE 101 performs handover, in other embodiments, UE 101 may perform cell reselection. The term "handover" may generally refer to handing an "active" connection over (e.g., in a 3GPP network). Embodiments of the present invention may also be directed to cell changes if the UE is in "idle" (i.e., not a connected) mode.

At step 6, in an embodiment of the present invention, the UE provides the WLAN with a new serving RAN node identifier (which identifies 3GPP RAN Node 2). Based on the information received in step 6, the WLAN may contact the appropriate 3GPP RAN (for example, to exchange load information or to inform the current WLAN node of the 3GPP RAN).

Embodiments of the present invention may also be used when the UE first attaches to the WLAN and then later to the 3GPP RAN. In this case, steps 1 and 2 are not performed. In a further embodiment of the present invention, this mechanism may also be used when the UE performs handover within the WLAN. In this case, the new serving node in the WLAN may learn the 3GPP RAN node identifier as the UE can perform step 6 after the handover. The 3GPP RAN node may learn the new WLAN serving node identifier (and other necessary parameters) when the 3GPP RAN node is contacted by the new serving WLAN node.

In certain embodiments of the present invention, during an initial attachment to the WLAN, the UE may transmit the serving RAN node identifier. If a WLAN is a trusted WLAN, the UE may send the new RAN node identifier (address) to the WLAN via WLAN Control Protocol (WLCP) signalling. WLCP can be used, but new WLAN specific signals (e.g., defined by WFA MBO or OCE or other working groups or by IEEE or by 3GPP) are also possible. WLCP is a 3GPP defined mechanism for multi-mode Trusted Wi-Fi access.

Figure 1B:
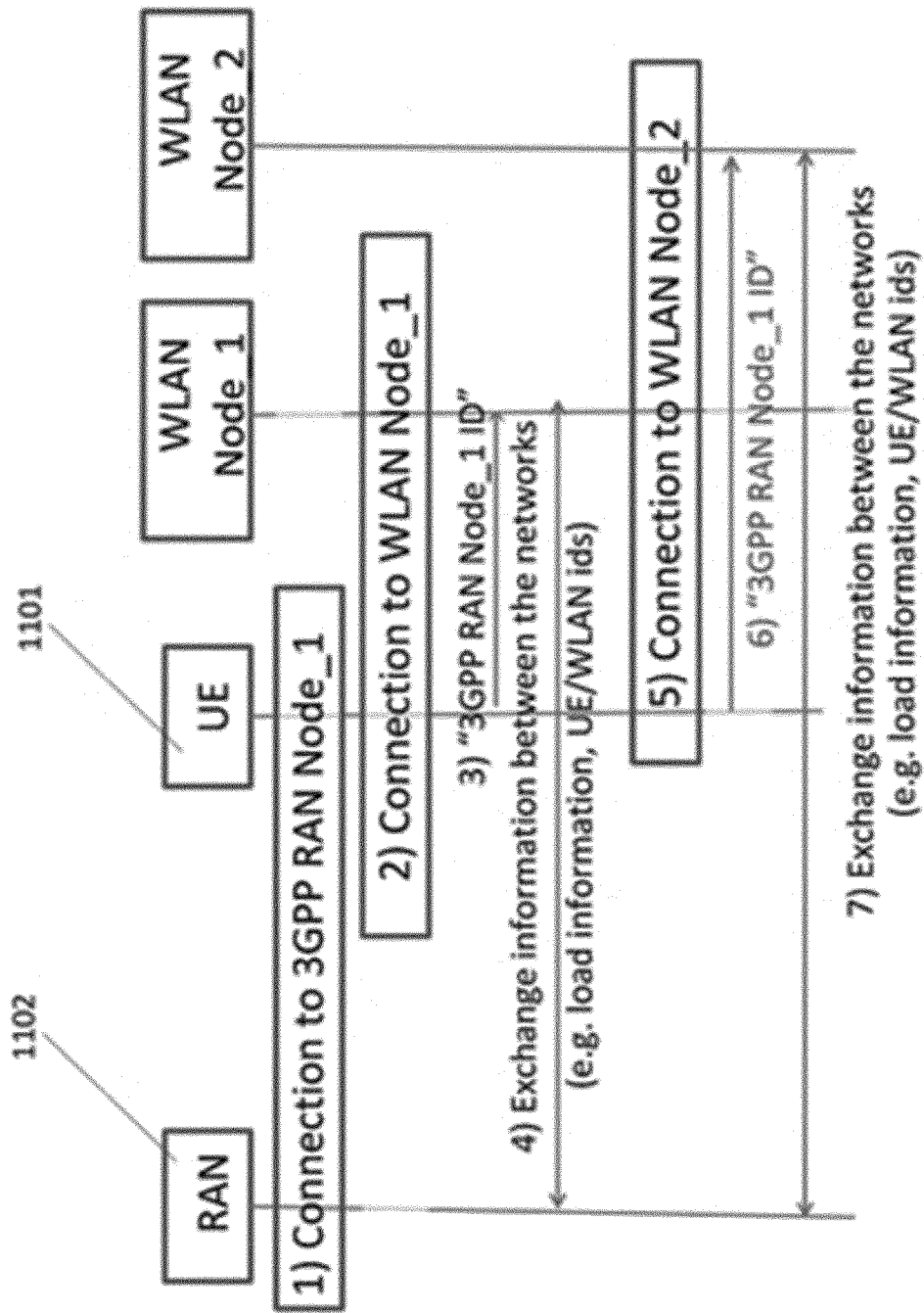
FIG. 1(b) illustrates using an identifier in accordance with one embodiment.

Referring to FIG. 1(b), during step 1, UE 1101 may be attached to a 3GPP RAN node 1102. Although step 1 illustrates that UE 1101 may be in a connected (active) state with respect to RAN 1102, with other embodiments, UE 1101 may be in an idle state on a cell of RAN 1102. During step 2, UE 1101 may create a connection to WLAN Node 1 as well. At step 3, the UE may provide a 3GPP RAN node identifier to the WLAN. At step 4, the WLAN can contact the appropriate 3GPP RAN (for example, to exchange load information). At step 5, the UE performs a handover from WLAN Node 1 to WLAN Node 2. At step 6, in an embodiment of the present invention, the UE provides the WLAN Node 2 with a RAN node identifier (which identifies 3GPP RAN 1102).

Embodiments of the present invention may provide certain advantages. For example, when using embodiments of the present invention, a UE (for example, in idle state) does not need to contact the 3GPP RAN in case of idle-state mobility. Further embodiments of the present invention do not have impact on the UE-3GPP interface. Embodiments of the present invention may provide the advantage where a 3GPP RAN node can learn which UEs are under its coverage, for example, UEs performing WLAN offloading. In this way, the 3GPP RAN can better estimate the impact when instructing UEs to perform "onloading." Embodiments of the present invention may also provide support when there is a handover within the WLAN. The UE may send the 3GPP RAN node identifier to the new WLAN serving node. The new WLAN serving node may contact the 3GPP RAN node, and thus the 3GPP RAN node may learn of the new WLAN serving node.

According to certain embodiments of the present invention, a new signalling may be defined. The UE can use this new signalling to indicate its cellular capabilities to the WLAN network. For example in a new message "Multimode (WiFi and Cellular) Indication" (transmitted from the UE to the WLAN network), a new information element may be added by the UE. The new information element may indicate the node (eNB) identifier or Cell ID where the UE is either camping on or having an active connection with. The WLAN network may forward this information to, for example, a logical Traffic Steering Server entity that may take this information into account, in addition to having situation awareness gathered from a cellular network, when deciding to which RAT to steer the UE to.

According to certain embodiments of the present invention, for 2G, a globally unique Cell ID may be used. The globally unique Cell ID may be formatted as follows: MCC+MNC+LAC+CI. A Mobile-Country Code (MCC) and Mobile-Network Code (MNC) may be 3 bytes, and a Location-Area Code (LAC) and a Cell ID (CI) may be 2 bytes. Sending MCC and MNC may be unnecessary, if these values are otherwise known. For example, MCC and MNC may be known if the WLAN network is operated by a same cellular operator as the 2G network. The WLAN access network may be operated by the 3GPP service provider. The WLAN network, therefore, may be aware of the MCC and MNC of the RAN nodes. According to certain embodiments of the present invention, for 3G, a Cell Identity may uniquely identify a cell within a Public-Land-Mobile-Network (PLMN). The Cell Identity may be a bit string of 28 bits. If the PLMN needs to be identified as well, then identification of the PLMN can be accomplished by using, for example, MCC and MNC.

According to certain embodiments of the present invention, for LTE, the Cell Identity may be defined in a similar manner as for 3G. The LTE Cell Identity may unambiguously identify a cell within a PLMN. The length of the Cell Identity may be 28 bits.

The device/UE may signal the Cell ID, along with a RAT type that is used to identify the format of the Cell ID, to the (WLAN) network. This signalling may be performed using a new "Multimode (WiFi and Cellular) Indication" message, as potentially part of forthcoming WFA MBO or OCE specifications. This indication message may be implemented as a 32-bit field, where a maximum of 28 bits may be used for the Cell ID while 4 bits may be used to indicate a cellular technology (for example, to indicate 2G, 3G, or LTE technologies).

Figure 2:
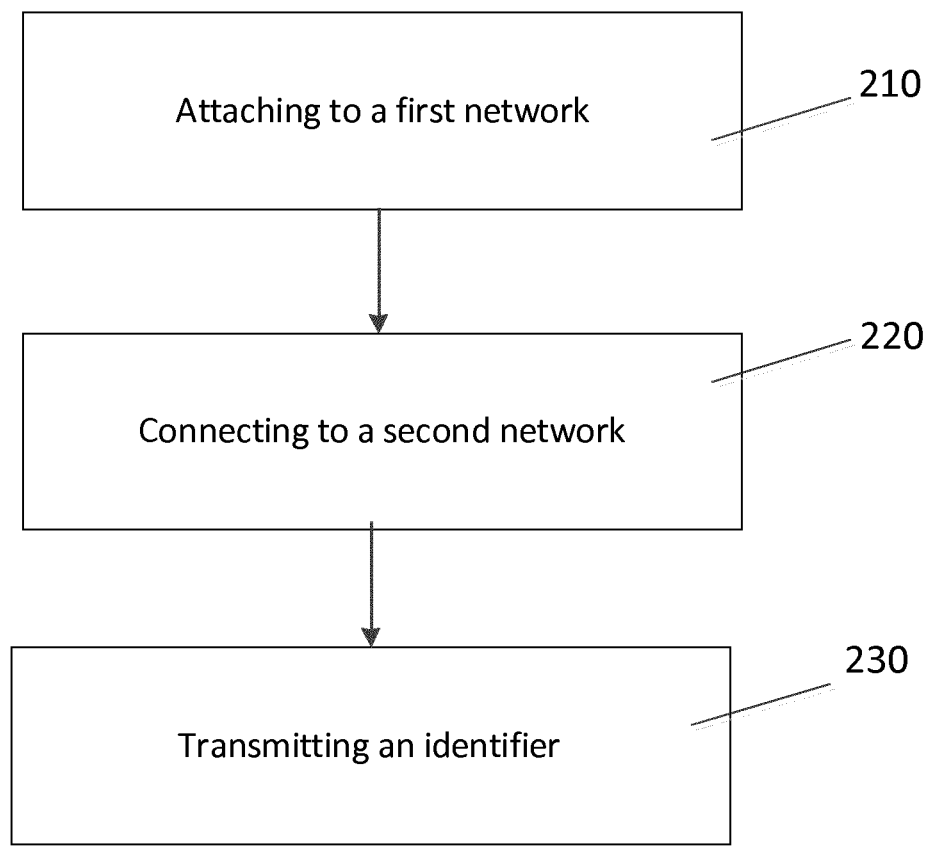
FIG. 2 illustrates a flowchart of a method in accordance with embodiments of the invention.

FIG. 2 illustrates a logic flow diagram of a method according to certain embodiments of the invention. The method illustrated in FIG. 2 may comprise, at 210, attaching, by a user equipment, to a first network. The first network may use a first radio-access technology. The user equipment may be idle within the first network or may be active within the first network. The method may also comprise, at 220, connecting to a second network. The second network may use a second radio-access technology. The method may also comprise, at 230, transmitting an identifier to the second network. The identifier may be related to a first network node (for example, an identity of the first network node) of the first network to which the user equipment may be attached to or where the user equipment may be camping on.

Figure 3:
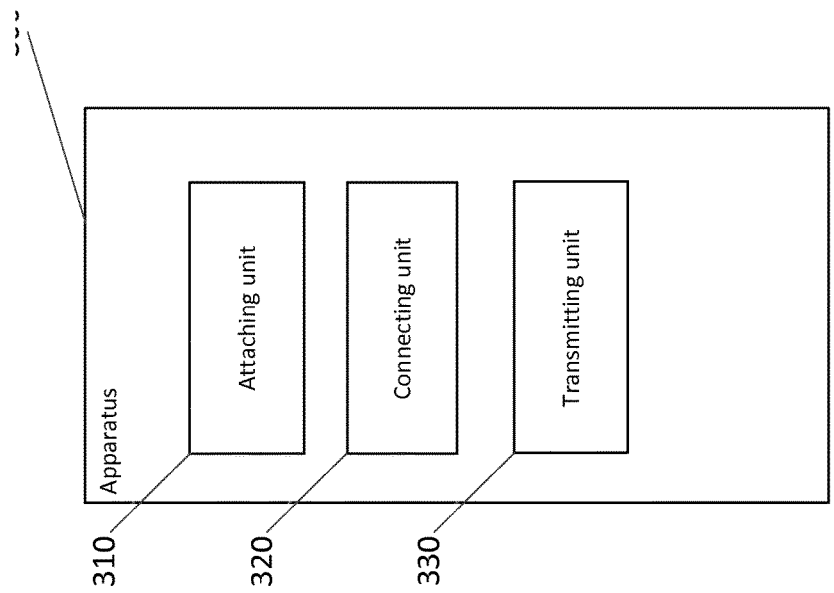
FIG. 3 illustrates an apparatus in accordance with embodiments of the invention.

FIG. 3 illustrates an apparatus in accordance with one embodiment. Apparatus 300 may comprise an attaching unit 310 that may be attached to or camping on a first network. The first network may use a first radio-access technology. Apparatus 300 may be idle within the first network or may be active within the first network. Apparatus 300 may comprise a connecting unit 320 that connects a second network. The second network may use a second radio-access technology. Apparatus 300 may comprise a transmitting unit 330 that may transmit an identifier to the second network. The identifier may relate to a first network node of the first network to which apparatus 300 may be attached to.

Figure 4:
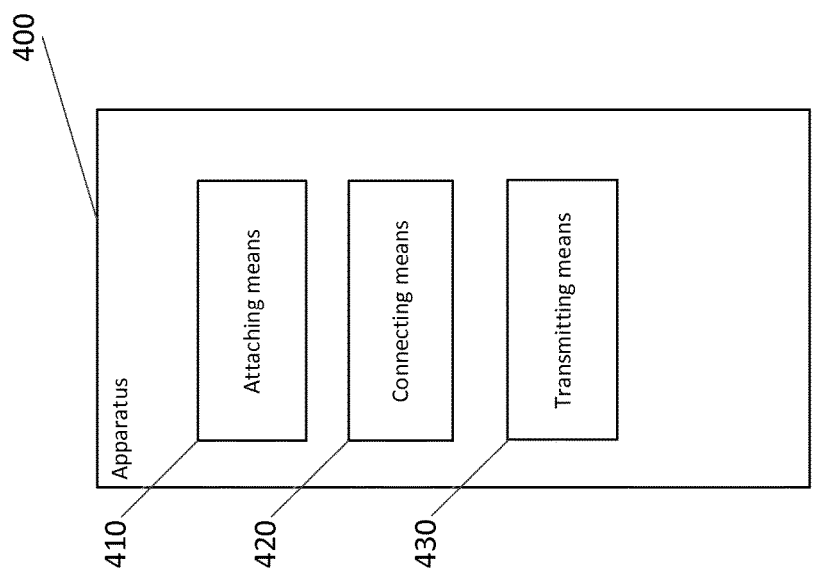
FIG. 4 illustrates an apparatus in accordance with embodiments of the invention.

FIG. 4 illustrates an apparatus in accordance with one embodiment. Apparatus 400 may comprise an attaching means 410 that may attach to a first network. The first network may use a first radio-access technology. Apparatus 400 may be idle within the first network or may be active within the first network. Apparatus 400 may comprise a connecting means 420 that may connect a second network. The second network may use a second radio-access technology. Apparatus 400 may comprise a transmitting means 430 that may transmit an identifier to the second network. The identifier may relate to a first network node of the first network to which apparatus 400 may be attached to.

Figure 5:
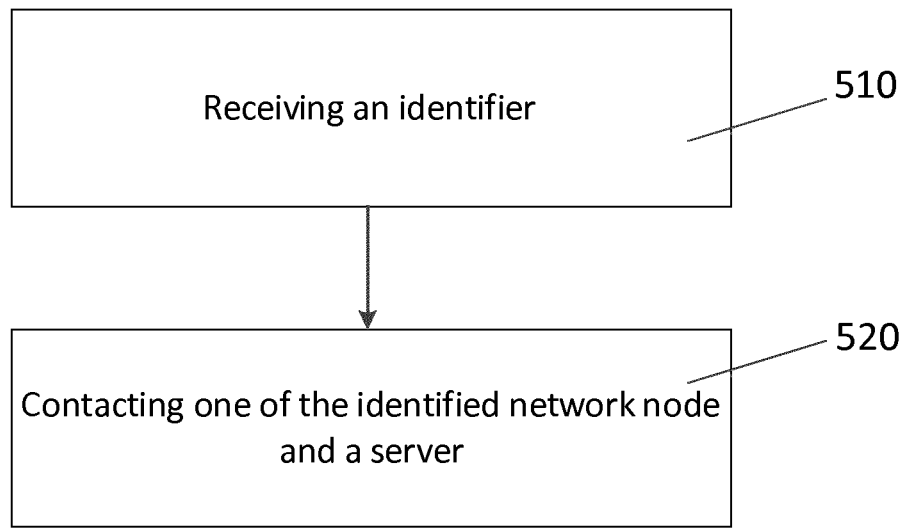
FIG. 5 illustrates a flowchart of a method in accordance with embodiments of the invention.

FIG. 5 illustrates a logic flow diagram of a method according to certain embodiments of the invention. The method illustrated in FIG. 5 may comprise, at 510, receiving, by a first network node of a second network, an identifier. The identifier may be received from a user equipment, the user equipment may be attached to a first network, the first network may use a first radio-access technology, the second network may use a second radio-access technology, and the identifier may relate to a first network node of the first network to which the user equipment may be attached. The method may also comprise, at 520, contacting one of the identified first network node of the first network and a server.

Figure 6:
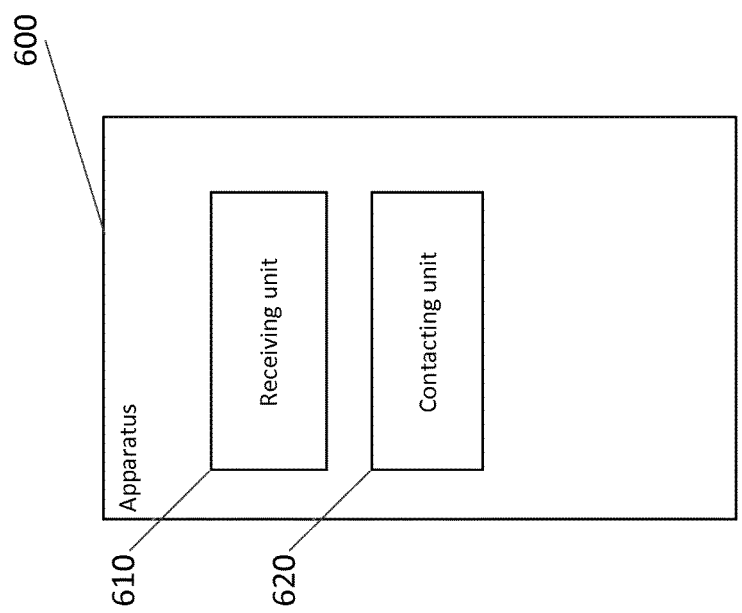
FIG. 6 illustrates an apparatus in accordance with embodiments of the invention.

FIG. 6 illustrates an apparatus in accordance with one embodiment. Apparatus 600 may comprise a receiving unit 610 that receives an identifier, wherein the identifier may be received from a user equipment, the user equipment may be attached to a first network, the first network may use a first radio-access technology, the apparatus 600 may be a node of a second network, the second network may use a second radio-access technology, and the identifier may relate to a first network node of the first network to which the user equipment may be attached. Apparatus 600 may also comprise a contacting unit 620 for contacting one of the identified first network node of the first network and a server.

Figure 7:
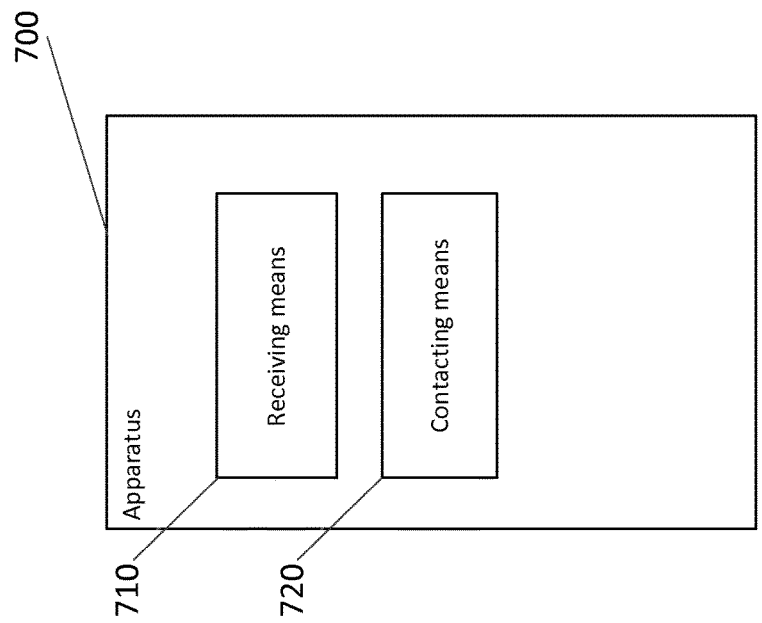
FIG. 7 illustrates an apparatus in accordance with embodiments of the invention.

FIG. 7 illustrates an apparatus in accordance with one embodiment. Apparatus 700 may comprise a receiving means 710 for receiving an identifier, wherein the identifier may be received from a user equipment, the user equipment may be attached to a first network, the first network may use a first radio-access technology, the apparatus 700 may be a node of a second network, the second network may use a second radio-access technology, and the identifier may relate to a first network node of the first network to which the user equipment may be attached. Apparatus 700 may also comprise contacting means 720 for contacting one of the identified first network node of the first network and a server.

Figure 8:
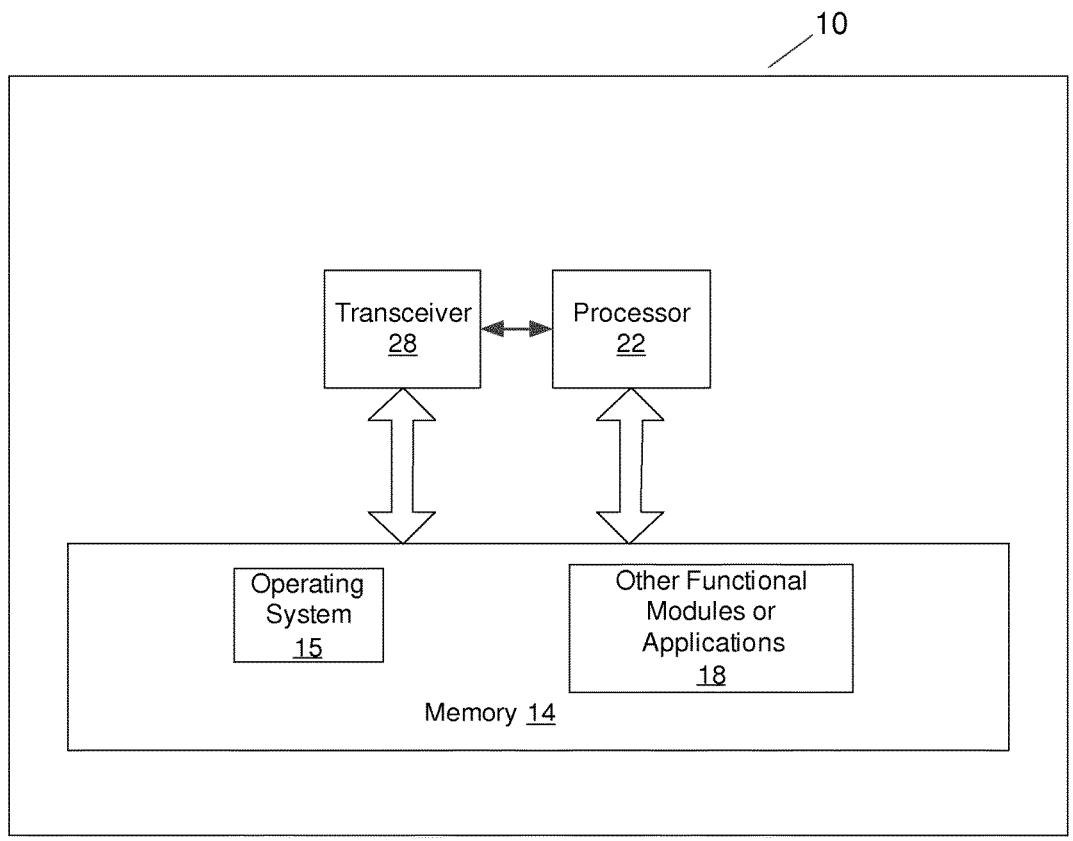
FIG. 8 illustrates an apparatus in accordance with embodiments of the invention.

FIG. 8 illustrates an apparatus 10 according to embodiments of the invention. Apparatus 10 can be a device, such as a user equipment, for example. In other embodiments, apparatus 10 can be a base station and/or access point, for example.

Apparatus 10 can comprise a processor 22 for processing information and executing instructions or operations. Processor 22 can be any type of general or specific purpose processor. While a single processor 22 is shown in FIG. 8, multiple processors can be utilized according to other embodiments. Processor 22 can also comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further comprise a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can comprise program instructions or computer program code that, when executed by processor 22, enable the apparatus 10 to perform tasks as described herein.

Apparatus 10 can also comprise one or more antennas (not shown) for transmitting and receiving signals and/or data to and from apparatus 10. Apparatus 10 can further comprise a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 comprising, without limitation, precoding of antenna gain/phase parameters, encoding and decoding of individual bits forming a communication message, formatting of information, and overall control of the apparatus 10, comprising processes related to management of communication resources.

In certain embodiments, memory 14 stores software modules that provide functionality when executed by processor 22. The modules can comprise an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 9:
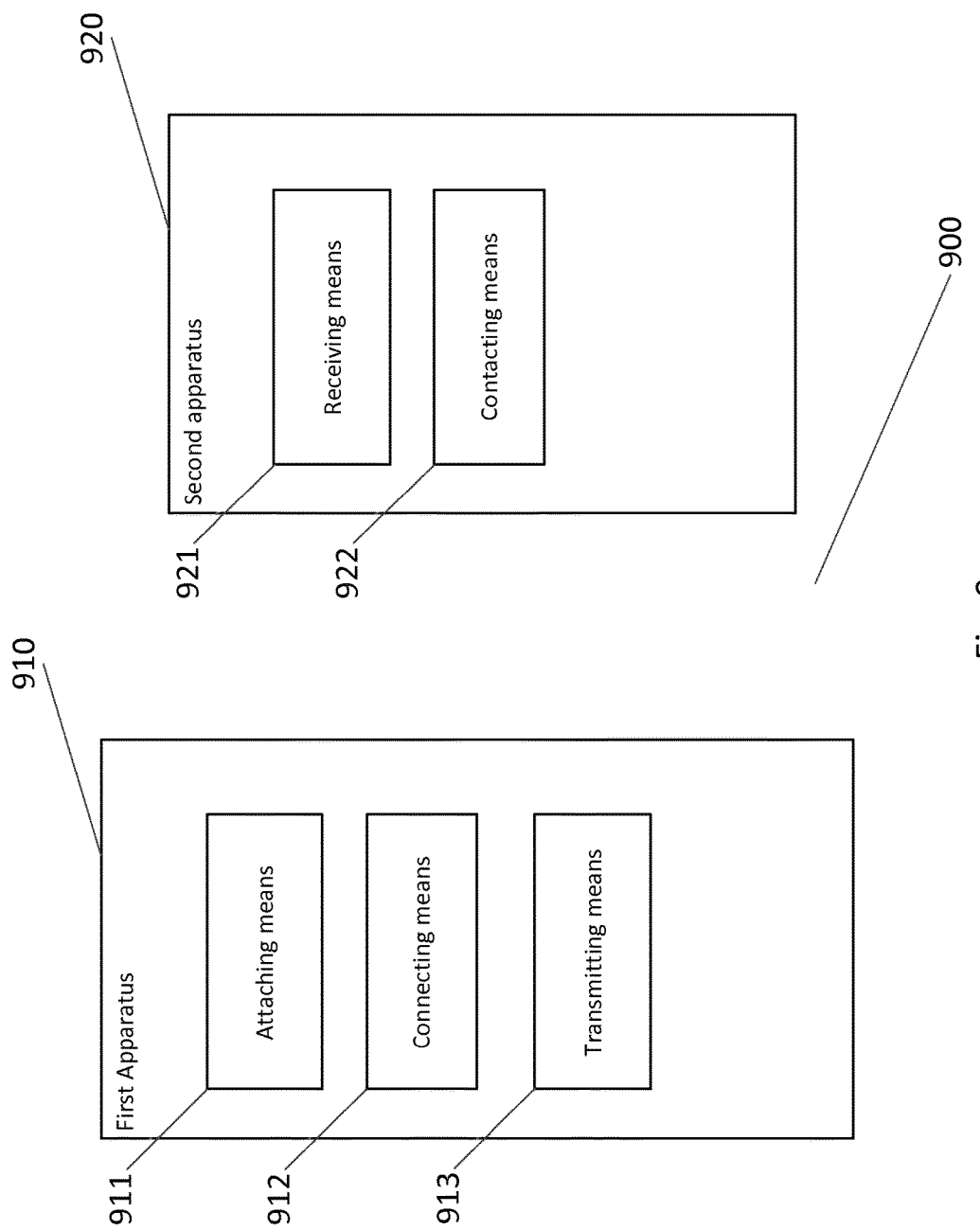
FIG. 9 illustrates a system in accordance with embodiments of the invention.

FIG. 9 illustrates a system in accordance with one embodiment. System 900 comprises a first apparatus 910. First apparatus 910 may comprise an attaching means 911 to attach to a first network, wherein the first network may use a first radio-access technology. First apparatus 910 may also comprise a connecting means 912 to connect to a second network, wherein the second network may use a second radio-access technology. First apparatus 910 may also comprise a first transmitting means 913 for transmitting an identifier to the second network. The identifier may relate to a first network node of the first network to which the first apparatus 910 may be attached. System 900 also comprises a second apparatus 920. Second apparatus 920 may comprise a receiving means 921 for receiving the identifier.

Second apparatus 920 may also comprise a contacting means 922 for contacting the identified first network node of the first network.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   attaching, by a user equipment, to a first network, wherein the first network uses a first radio-access technology;
   connecting to a second network, wherein the second network uses a second radio-access technology; and
   transmitting an identifier to the second network in an information element of a signaling message after the user equipment performs cell re-selection from a second network node of the first network to a first network node of the first network, after the user equipment has performed handover from a second network node of the first network to a first network node of the first network, or after the user equipment performs a change from a second network node of the second network to a first network node of the second network,
   wherein the identifier relates to the first network node of the first network to which the user equipment is attached and enables the second network to exchange load information with the first network node of the first network, and
   the identifier comprises at least one of an identifier of the first network node of the first network, a current cell identity of the first network node of the first network, and a globally unique cell identity of the first network node of the first network.

2. The method according to claim 1, wherein the first radio-access technology corresponds to a cellular Radio-Access Network, and the second radio-access technology corresponds to a Wireless Local Area Network.

3. An apparatus, comprising:
   at least one processor; and
   at least one memory comprising computer program code, and
   wherein the at least one memory and the computer program code are configured, with the at least one processor to cause the apparatus to:
   attach to a first network, wherein the first network uses a first radio-access technology;
   connect to a second network, wherein the second network uses a second radio-access technology; and
   transmit an identifier to the second network in an information element of a signaling message after the apparatus performs cell re-selection from a second network node of the first network to a first network node of the first network, after the apparatus has performed handover from a second network node of the first network to a first network node of the first network, or after the apparatus performs a change from a second network node of the second network to a first network node of the second network,
   wherein the identifier relates to the first network node of the first network to which the apparatus is attached and enables the second network to exchange load information with the first network node of the first network, and
   the identifier comprises at least one of an identifier of the first network node of the first network, a current cell identity of the first network node of the first network, and a globally unique cell identity of the first network node of the first network.

4. The apparatus according to claim 3, wherein the first radio-access technology corresponds to Radio-Access Network, and the second radio-access technology corresponds to a Wireless Local Area Network.

5. The apparatus according to claim 3, wherein the apparatus comprises a user equipment.

6. A method, comprising:
   receiving, by a first network node of a second network, an identifier in an information element of a signaling message,
   wherein the identifier is received from a user equipment after the user equipment performs cell re-selection from a second network node of the first network to a first network node of the first network, after the user equipment has performed handover from a second network node of the first network to a first network node of the first network, or after the user equipment performs a change from a second network node of the second network to a first network node of the second network,
   the user equipment is attached to a first network, the first network uses a first radio-access technology, the second network uses a second radio-access technology, and the identifier relates to the first network node of the first network to which the user equipment is attached, and the identifier comprises at least one of an identifier of the first network node of the first network, a current cell identity of the first network node of the first network, and a globally unique cell identity of the first network node of the first network; and
   contacting one of the identified first network node of the first network and a server, wherein the contacting the identified first network node comprises exchanging load information with the identified first network node.

7. The method according to claim 6, wherein the Server comprises a Traffic Steering Server entity.

8. The method according to claim 6, wherein the first radio-access technology corresponds to Radio-Access Network, and the second radio-access technology corresponds to Wireless Local Area Network.

* * * * *